United States Patent [19]

Koeneman

[11] 4,006,892
[45] Feb. 8, 1977

[54] COMPRESSION MOUNTING

[75] Inventor: James B. Koeneman, Erie, Pa.

[73] Assignee: Lord Corporation, Erie, Pa.

[22] Filed: Dec. 15, 1975

[21] Appl. No.: 640,359

[52] U.S. Cl. .................... 267/153; 248/358 R; 267/63 R

[51] Int. Cl.² .................................. F16F 1/36

[58] Field of Search .......... 267/33, 54 A, 57.1 R, 267/57.1 A, 63 R, 63 A, 151, 152, 153, 157; 248/7–10, 18, 21, 22, 358 R

[56] References Cited

UNITED STATES PATENTS

| | | | |
|---|---|---|---|
| 1,703,297 | 2/1929 | Chase | 248/358 R X |
| 2,044,649 | 6/1936 | Swennes et al. | 267/63 R X |
| 2,359,942 | 10/1944 | Rosenzweig | 248/358 R X |
| 3,081,993 | 3/1963 | Wallerstein | 267/63 R X |
| 3,504,905 | 4/1970 | Irwin | 267/151 |
| 3,892,398 | 7/1975 | Marsh | 267/153 |

Primary Examiner—Johnny D. Cherry
Attorney, Agent, or Firm—Maurice R. Salada; James W. Wright

[57] ABSTRACT

A compression mounting comprises a body of elastomer and a pair of load-transmitting devices that engage and cover two opposed and spaced apart surfaces of the elastomeric body. The two load-transmitting devices are disposed and configured to expose a circumferential surface of the body of elastomer. At least a circumferential portion of the surfaces so exposed is completely covered and enclosed by a shell or housing. The shell includes a filamentary structure that provides a plurality of substantially parallel and juxtaposed filament portions oriented to circumscribe the surface of the elastomeric body. The filament portions are less extensible than the elastomer of the elastomeric body. A matrix material encases the filament portions and flexibly bonds adjacent filament portions to one another. The shell snugly fits the surface of the elastomeric body and is more resistant to circumferential expansion than the elastomeric body. The shell thus impedes, at least, the circumferential expansion of the elastomeric body in response to compression loads exerted on the body through the load-transmitting devices. As a result, the capacity of the mounting to support compressive loads is increased relative to a mounting incorporating unconfined elastomer. The matrix material permits adjacent filament portions to move in parallel planes relative to each other so that the shell and the mounting can deflect in response to torsional loads.

13 Claims, 4 Drawing Figures

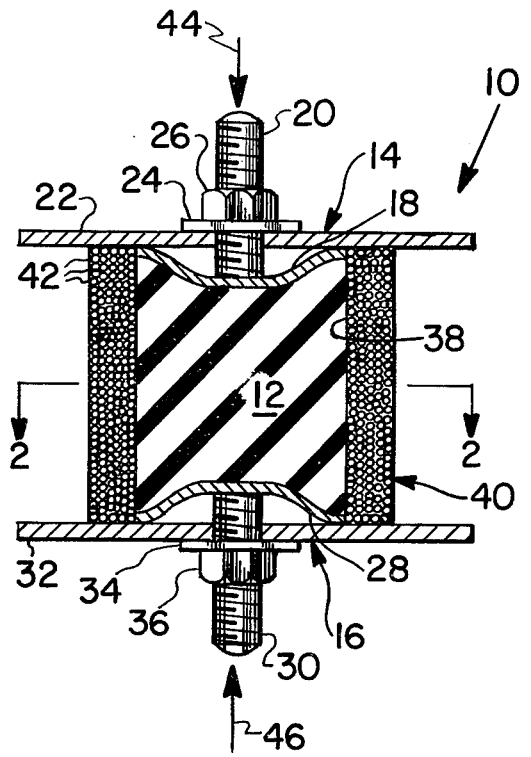
Fig. 1
Fig. 2
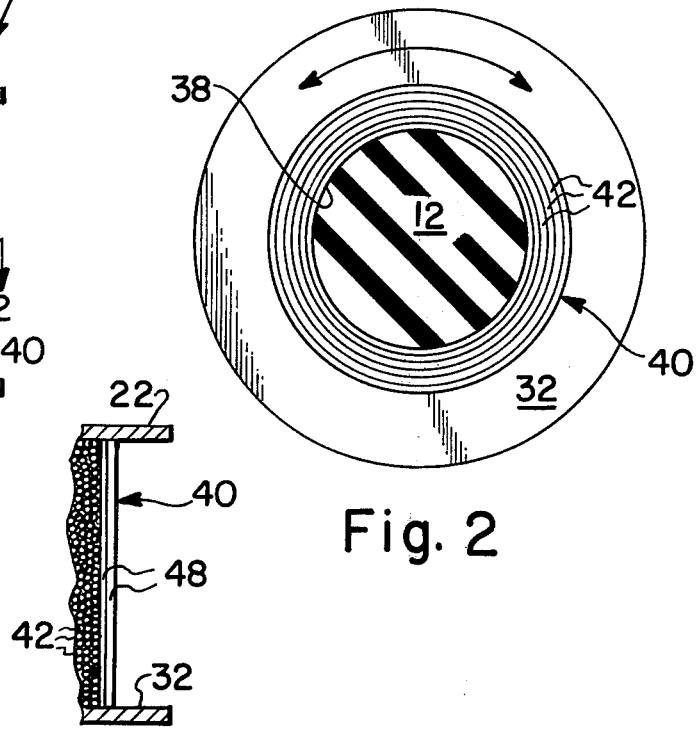
Fig. 3
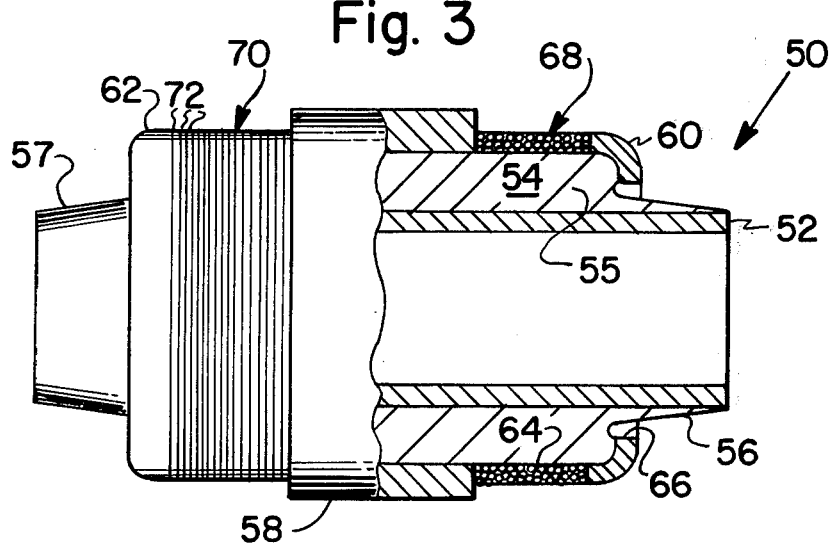
Fig. 4

COMPRESSION MOUNTING

BACKGROUND OF THE INVENTION

The compressive load carrying capacity of a body or layer of elastomeric material may be increased several hundred percent by incorporating a plurality of spaced, parallel laminae fabricated of nonextensible material and oriented generally perpendicular to the direction of the compressive load. The laminae increase the compressive load carrying capacity of the elastomeric material by restricting the ability of the material to deflect or bulge in directions transverse to the direction of the compressive load. Specifically, the laminae effectively subdivide the force-free or non-loaded surfaces that extend between the loaded surfaces of the elastomeric material. When loaded in compression, therefore, the material cannot deflect along its force-free surfaces in a large bulge that is continuous between the loaded surfaces of the material. Instead, the "subdivided" force-free surfaces can only deflect in a series of distinct and separate smaller bulges.

The total volume of material in the smaller bulges of a laminated elastomeric structure is significantly less than in the large single bulge that appears in an unlaminated body of elastomeric material. Thus, for a given load, the laminated structure exhibits a smaller change or reduction in height or length than would be experienced by the same body of elastomer without laminae. Since the height or length reduction is a critical parameter for practical use of elastomeric material under compressive loads, the compressive load carrying capacity of the material is increased. At the same time, the ability of the material to yield in shear or torsion in directions parallel to the laminations or transverse to the direction of the compressive load is substantially unaffected.

The characteristics of laminated elastomeric bearings have resulted in the commercial acceptance of the bearings for a variety of applications. Nonetheless, the basic design concept on which the bearings rely also has an adverse effect on their acceptability. In particular, to increase the compressive load carrying capacity of a laminated bearing, while maintaining a specified torsional or translational shear deflection capability, the number of non-extensible laminations must be increased. The non-extensible material is often a high-strength and expensive metal, such as titanium or stainless steel. For many bearing configurations, the metal must be carefully machined, at extra cost. In addition to the expense of the nonextensible laminations, they represent a significant portion, if not substantially all, of the weight of a laminated bearing. The increased cost and weight of higher capacity laminated bearings have thus placed limitations on their commercial acceptance.

Another approach to increasing the compressive load carrying capacity of a layer of elastomeric material is to restrict the ability of the material to bulge by enclosing the force-free surfaces of the material in a circumferential shell or housing. Rosenzweig U.S. Pat. No. 2,359,942 and Wallerstein, Jr. U.S. Pat. No. 3,081,993 both describe and illustrate resilient mountings in which the force-free surfaces of a body of elastomer are partially or wholly enclosed by a bulge-restricting shell. In the Rosenzweig mounting, the body of elastomer is completely encased in a rigid metal housing. Nonetheless, the elastomer is free to bulge to a limited extent because of an annular body of resilient material interposed between the body of elastomer and the rigid housing. The intermediate resilient material is significantly more compressible than the elastomer (i.e., it has a lower Poisson's ratio), and can be compressed by, and to accommodate, bulging of the elastomer. In the Wallerstein, Jr. mounting, a relatively wide, split metal band encircles a cylindrical body of elastomer. A garter spring normally prevents the ends of the band from separating. Thus, when the mounting is loaded in compression, the band initially prevents the central longitudinal portion of the body from bulging. When a predetermined compressive load is reached, however, the elastomer forces the split band open against the resistance of the garter spring. The mounting thereafter deflects or bulges at an increased rate for higher compressive loads.

Although both the Rosenzweig mounting and the Wallerstein, Jr. mounting may be effective in increasing the compression load carrying capacity of a body of elastomeric material, neither mounting is intended to accommodate significant torsional or translational shear motions. In the Wallerstein, Jr. mounting, for example, translational shearing movements between the rigid end members 2 and 3 that are secured to the body of elastomer can only be accommodated by shearing of the unconfined end portions of the elastomer. Similarly, the frictional engagement between the split band and the exterior surface of the elastomeric body effectively prevents the confined central portion of the elastomeric body from deflecting in torsional shear. The Rosenzweig mounting is constructed such that translational movements between a supported and a supporting member stress the elastomer of the mounting in compression, rather than shear. Relative rotation between the supported and supporting members will be strongly resisted by the friction developed between the body of elastomer and the adjacent, radially extending metal parts. A particular problem will be the friction developed beween the elastomer and the lower supporting washer 6 and the related friction developed between the washer 6 and the abutment ring 5.

The use of a bulge-restraining housing or shell in an elastomeric mounting that is intended to accommodate both compressive and torsional loads has been suggested by Irwin U.S. Pat. No. 3,504,905. In the mountings or bearings of the Irwin patent, particularly the bearings of FIGS. 7, 8 and 9, an openwork mesh of wire, for example, encloses the circumference of a laminated elastomeric bearing. The mesh impedes, but does not prevent, the lateral extrusion or bulging of the elastomer from between the nonextensible laminae. At the same time, the openwork structure of the mesh permits parallel movements between adjacent woof strands so as to accommodate twisting or torsional loading of the bearing.

SUMMARY OF THE INVENTION

The present invention is directed to a compression mounting in which at least a portion of an elastomeric body is completely enclosed so that it cannot freely expand circumferentially in response to compressive loads. The shell that encloses the body can be flexed in torsion, however, so as to permit the mounting to accommodate torsional loads. According to the invention, a compression mounting comprises a body of elastomer and a pair of load-transmitting devices that engage and cover at least parts of two opposed and spaced apart surfaces of the body of elastomer. The two load-transmitting devices are disposed and configured to expose a circumferential surface of the elastomeric body. A shell completely covers and encloses at least a circumferential portion of the exposed surface of the elastomeric body. The shell includes a filamentary structure that provides a plurality of substantially parallel and juxtaposed filament portions oriented to circumscribe the exposed circumferential surface. The filament portions are less extensible than the elastomer of the elastomeric body. A matrix material encases the filament portions and flexibly bonds adjacent filament portions to one another in substantially parallel relationship. The shell snugly fits the surface of the elastomeric body and, because of the filament portions, is more resistant to circumferential expansion than the elastomeric body. The shell thus impedes, at least, the circumferential expansion (i.e., bulging) of the enclosed portion of the exposed surface of the body of elastomer. Such a restriction on the ability of the elastomer to deflect in response to compressive loads applied through the load-transmitting devices increases the compressive load carrying capability of the mounting. Since adjacent filament portions are flexibly bonded together by the matrix material, they can move in parallel planes relative to each other so as to permit the shell and the mounting to deflect in response to torsional loads.

In a preferred embodiment of the invention, each load-transmitting device includes a rigid cover plate that engages and covers the corresponding surface of the body of elastomer. The shell completely covers all of the exposed circumferential surface of the body of elastomer so that the shell and the load-transmitting devices cooperate to cover all exterior surfaces of the body of elastomer. The shell is also substantially nonextensible in a circumferential direction as compared to the body of elastomer. The preferred embodiment of the invention thus permits torsional flexibility of the mounting while simultaneously maximizing the compressive load carrying capability of the mounting.

The filamentary structure of the inventive mounting is preferably formed by a single continuous strand fabricated of a multiplicity of filaments oriented lengthwise of the strand. The strand is helically wound in a plurality of turns around the body of elastomer. The juxtaposed filament portions of the shell thus include both adjacent portions of distinct filaments in the strand and any adjacent turns of an individual filament. The matrix material encases each individual turn of the strand and preferably bonds the entire shell to the body of elastomer. The body of elastomer may be cylindrical in shape and its ends may be bonded to the rigid cover plates of the load-transmitting devices. If the load-transmitting devices are disposed at opposite ends of the body of elastomer, each device includes a flange extending laterally beyond the side edges of the body of elastomer so as to engage and support the shell adjacent the ends of the body.

BRIEF DESCRIPTION OF THE DRAWING

For a better understanding of the invention, reference may be made to the following description of three exemplary embodiments, taken in conjunction with the figures of the accompanying drawing, in which:

FIG. 1 is a side sectional view of a compression mounting according to the present invention;

FIG. 2 is a plan sectional view of the mounting of FIG. 1, taken along view line 2—2 of FIG. 1;

FIG. 3 is a partial side sectional view of a modified version of the mounting of FIGS. 1 and 2; and FIG. 4 is a plan view, partly in section, of another embodiment of a compression mounting according to the present invention.

DESCRIPTION OF EMBODIMENTS

FIG. 1 of the drawing illustrates a compression mounting 10 according to the present invention. The mounting 10 includes a generally cylindrical body of elastomer 12 and a pair of load-transmitting cover assemblies 14 and 16, one at each end of the elastomeric body. The cover assembly 14 includes a circular, rigid cover plate 18 that completely covers and is bonded to an adjacent end of body of elastomer 12. Projecting from the center of the plate 18 is a threaded shaft 20 over which is placed an annular, flat support plate 22 of larger diameter than the cover plate 18. The support plate 22 is held in place by a washer 24 and a hex nut 26 threaded on the end of the shaft 20. The cover assembly 16 is identical to the assembly 14. A threaded shaft 30 projects from the center of a rigid, circular end plate 28. An annular support plate 32 is carried on the threaded shaft 30 and a washer 34 and a hex nut 36 secure the support plate 32 on the shaft 30.

Since the cover assemblies 14 and 16 are disposed at opposite ends of the body of elastomer 12, the annular circumferential surface 38 of the elastomeric body is exposed between the two cover assemblies. The circumferential surface 38 is completely enclosed and covered, however, by an annular shell 40. The shell 40 includes a filamentary structure that provides a multiplicity of substantially parallel and juxtaposed filament portions oriented to circumscribe the circumferential surface 38. The filamentary structure preferably results from helically winding a continuous strand of fibrous or filamentous material about the body of elastomer 12. As will become apparent, the fibrous material should preferably be a high strength and high Young's modulus material, such as graphite fibers, Kevlar fibers, or glass fibers. Such a material will be substantially nonextensible as compared to the body of elastomer 12. As an example, carbon fibers may have a Young's modulus of $30-75 \times 10^6$ psi, while natural rubber may have a Young's modulus of 100–2000 psi. The helically wound strand may be either a single continuous filament or a multiplicity of filaments oriented generally in a single direction (i.e., lengthwise of the strand). In the case of a single filament strand, the adjacent turns of the filament will define the desired parallel and juxtaposed filament portions. The desired filament portions will be provided in a multiple filament strand by the adjacent portions of distinct filaments and by adjacent turns of any single filament. A multiple filament strand is preferred because the filaments in adjacent windings or turns 42 of the strand will tend to intermingle and make the boundaries between adjacent turns less distinct. Thus, although FIG. 1 of the drawing illustrates sharply defined windings or turns 42 for purposes of facilitating an explanation of the invention, the windings should preferably be indistinguishable. The intermingling of filaments that occurs with a multiple filament strand should not be such as to disrupt the substantial parallelism of the filaments.

The strand of fibrous material is coated with a liquid elastomeric coating prior to being wound around the elastomeric body 12. Suitable coatings include Chemglaze M-313 polyurethane coating, Adiprene polyurethane, and a combination of Chemglaze M-313 polyurethane and Poly B-D polymer. Coatings that will have a low Young's modulus when cured are preferred. Prior to coating a carbon fiber strand, in particular, the carbon filaments should be coated with a suitable sizing to reduce fraying and to enhance the adhesion between the filaments and the elastomeric coating. When the winding process is completed, the elastomeric coating is allowed to cure to form a flexible matrix material. The matrix material encases and embeds each individual turn or winding 42, and preferably each individual filament. The windings 42 of the strand are thus flexibly bonded to each other, as are adjacent individual filaments. The matrix material also bonds the radially innermost run of windings 42 to the circumferential surface 38 of the body of elastomer 12 and to the outer edges of the cover plates 18 and 28. The bond between the windings 42 and the surface 38 may be enhanced by applying any conventional elastomer adhesive to the surface 38 prior to winding. As an alternative, the windings 42 may be bonded just to the edges of the cover plates 18 and 28, and not to the surface 38 of the elastomeric body 12. Opposite ends of the shell 40, as shown in FIG. 1, are supported by the annular support plates 22 and 32 of the cover assemblies 14 and 16, respectively.

When constructed as shown in FIG. 1 of the drawing, the mounting 10 can accommodate substantial, axially directed, compressive loads applied through the cover assemblies 14 and 16. A compressive load may be applied, in the direction of the arrows 44 and 46, by securing the threaded shafts 20 and 30 to a supported member (not shown) and a supporting member (not shown), respectively. The compressive load is transmitted to the body of elastomer through the threaded shafts 20 and 30 and the rigid end plates 18 and 28. The body of elastomer 12 attempts to bulge or expand circumferentially in response to the compressive load and thereby exerts a radially directed load on the shell 40 all about its inner circumference. The radial load on the shell loads the windings 42 and the filaments of the windings in tangentially directed tension or what may be termed "hoop tension". Since the fibrous material in the windings 42 preferably has a high strength and a high Young's modulus (i.e., it is substantially inextensible), it prevents the elastomer from expanding so that any deflection of the body of elastomer 12 must be through bulk compression. Since the bulk modulus of a body of elastomer is several hundred times greater than the compression modulus of the same body of elastomer when it is left free to bulge and deflect, the capacity of the mounting 10 to carry a compressive load is substantially increased in comparison to a similar mounting with an unconfined body of elastomer.

The mounting 10 has the ability to carry an extremely large compression load and still accommodate oscillatory rotational movements between a supported member (not shown) and a supporting structure (not shown). Rotational movements may be applied through the threaded shafts 20 and 30 and the rigid end plates 18 and 28, for example. Since the end plates 18 and 28 are bonded to opposite ends of the body of elastomer 12, the elastomer will be loaded in torsion. The shell 40, which is bonded to the circumferential surface 38 of the body of elastomer 12, will also be loaded in torsion. The flexible bond provided by the matrix material in the shell 40 permits relative parallel movement between adjacent filament portions, to include adjacent turns or windings 42 of the helically wound strand and adjacaent filaments in the strand. In operation, therefore, the shell 40 is free to flex in torsion with the body of elastomer 12 to accommodate torsional loads. The shell 40 may be characterized as anisotropic, being extremely stiff in response to hydrostatic-type radial loads, but being relatively soft in response to torsional loads.

Test specimens resembling the mounting 10 of FIG. 1 were constructed and tested for compression and torsional load capabilities. The bodies of elastomer in the test samples were fabricated of neoprene and varied from 0.38 inch in diameter by 0.50 inch high to 2 inches in diameter by 2 inches high. The cover assemblies were fabricated of steel. The exposed circumferential surfaces of the bodies of elastomer were painted with an adhesive and then covered with windings of fibrous material. The windings were formed by a continuous strand of graphite or Kevlar fibers coated with an elastomeric polyurethane coating. The radial thicknesses of the completed shells in the test samples varied from 0.16 inch to 2.06 inches. The samples exhibited maximum compression stiffnesses in the range of 140,000 to 500,000 pounds per inch and torsional stiffnesses in the range of 4 to 90 inch pounds per degree. The ultimate (failure)compressive loads on the samples varied from 7,400 pounds to 54,000 pounds with a vertical deflection (compression) of from about 0.1 inch to about 0.4 inch. The measured torsional stiffnesses were based on as much as 26° of torsional rotation. It is believed that the angle at which the strand of fibrous material is wound around the body of elastomer is significant and that the angle should preferably be maintained as close as possible to 0° (90° to the longitudinal axis of the mounting). Larger angles of wrap are believed to increase the torsional stiffness of the mounting. Increased torsional stiffness may or may not be desirable, depending upon the proposed use of the mounting.

The testing described above indicates that if axial loads are applied eccentric to the longitudinal axis of a mounting similar to the mounting 10, the mounting is likely to fail by buckling and extrusion of elastomer, rather than by failure of the filamentary structure of the shell 40. Buckling-type failure occrs at lower compressive loads than filamentary structure failure and thus reduces the usefulness of a mounting such as mounting 10. It is believed that the tendency to buckle can be overcome by incorporating in the shell 40 a plurality of filament portions oriented lengthwise of the mounting 10. As shown in FIG. 3, the longitudinally oriented or polar filament portions may be incorporated in longitudinal or polar filamentary strands 48 that overlie the windings 42. The strands 48 of FIG. 3 are not wound on the elastomeric body 12, but are applied in the form of a sheet of strands in a cured elastomeric matrix. The sheet of strands 48 and matrix material is secured to the windings 42 by any suitable adhesive. The longitudinally oriented filament portions may also be incorporated in the shell 40 by winding a single filamentary strand about the elastomeric body 12 and the cover plates 18 and 28, at least. One technique for applying such polar windings is described and illustrated in Krupp U.S. Pat. No. 3,112,234. At torsional deflections greater than about 5°–10°, polar windings will significantly and sharply increase the torsional stiffness of a mounting such as mounting 10.

FIG. 4 of the drawing illustrates another embodiment 50 of the invention. The mounting 50 is a modified form of a conventional mounting that accommodates high radial loads and oscillatory relative rotation between its radially inner and outer surfaces. The mounting 50 comprises a tubular inner metal member 52 surrounded by an annular body of elastomeric material 54. The main section 55 of the body of elastomeric material 54 is shorter than the tubular member 52, although a thin tapered section 56 or 57 of elastomeric material extends axially from each end of the main section 55 to the ends of the tubular member 52. Centered lengthwise of the body of elastomer 54 and the tubular member 52 is an annular sleeve 58 that encircles the body of elastomer and is bonded to the outer circumference 64 of the elastomer. Also surrounding the body of elastomer 54 but spaced axially from the sleeve 58 are a pair of annular and axially spaced apart end caps 60 and 62. Each of the end caps 60 and 62 engages and covers an end portion of the outer circumferential surface 64 of the main section 55 of the body of elastomer 54. The caps 60 and 62 also extend from the circumferential surface 64 over opposite ends of the main elastomeric section 55 and radially inwardly toward the tubular member 52. The radially innermost edges 66 of the end caps 60 and 62 are spaced radially from the tubular member 52 and from the tapered sections 56 and 57 of elastomeric material. The configuration of the end caps 60 and 62 permits limited relative radial movement between the caps and the tubular member 52.

Between the rigid sleeve 58 and each of the end caps 60 and 62 is an "exposed" portion of the outer circumferential surface 64 of the body of elastomer 54. Each "exposed" portion of the surface 64 is covered by a shell 68 or 70 that extends axially of the body of elastomer 54 between the sleeve 58 and the corresponding end cap 60 or 62. As in the shell 40 of FIGS. 1 and 2, each of the shells 68 and 70 comprises a multiplicity of substantially parallel and adjacent windings 72 embedded and encased in a flexible matrix material. The windings 72 are preferably formed of a continuous strand of fibrous or filamentous material coated with a flexible elastomeric coating. The fibrous material may be any one of several high strength, high Young's modulus materials, as discussed previously in connection with the mounting 10 of FIGS. 1 and 2. The coating or matrix material may similarly be any one of a number of flexible coatings. The shells 68 and 70 are bonded to the circumferential surface 64 of the body of elastomer 54 and to the adjacent surfaces of the sleeve 58 and the end caps 60 and 62. The bond to the surface 64 may be omitted, however.

The mounting 50 functions in generally the same manner as a conventional mounting that has a solid metal sleeve extending between and integral with the end caps 60 and 62. The mounting 50 will typically receive a shaft (not shown) through the central tubular member 52 and be pressed into a socket (not shown) that will engage the outer sleeve 58. The shaft will thus support the member defining the socket, through the mounting 50. One conventional installation would be as a shaft passing through an eye at one end of a leaf spring in a motor vehicle. In such installations, the mounting 50 is subjected to high compressive loads applied in a radial direction between the tubular member 52 and the outer sleeve 58. The shells 68 and 70 prevent the body of elastomer 54 from bulging radially in response to a radially directed compression load. The body of elastomer 54 can only bulge at its ends through the spaces between the end caps 60 and 62 and the tubular member 52. The mounting 50 will thus provide essentially the same radial compressive load carrying capabilities as a conventional mounting that incorporates a continuous outer sleeve.

The advantage of the mounting 50 of FIG. 4 over a conventional mounting of the same general type is that the body of elastomer 54 is less highly stressed in response to relative rotation between the tubular member 52 and the outer sleeve 58. In a conventional mounting, the radially inwardly depending flanges of the end caps 60 and 62 are part of and rotate with the outer sleeve 58 relative to the tubular member 52. As a result, the relative rotational movement between the sleeve and the tubular member is accommodated solely by torsional flexing of only that portion of the body of elastomer located between the radially innermost edges of the end caps and the inner tubular member. The relatively high strains imposed on the limited volume of elastomer being loaded in torsion effectively reduce the fatigue life of the elastomer. In the mounting 50, on the other hand, the end caps 60 and 62 can rotate relative to the sleeve 58 due to the torsional flexibility of the shells 68 and 70. The torsional load on the mounting is thus shared by the elastomeric material between the sleeve 58 and the end caps 60 and 62 and by the material between the end caps and the tubular inner member 52. The torsional load on the portion of the body of elastomer between the radially innermost edges 66 of the end caps 60 and 62 and the tubular member 52 is reduced and the fatique life of the mounting 50 is significantly improved as compared to a conventional mounting.

Although the foregoing discussion has dealt with shells comprising fibrous materials, such as carbon fibers, encapsulated with elastomeric materials, any other material or combination of materials that will provide the desired filamentary structure and flexible matrix may be utilized. For example, it is believed that the shell for a mounting such as described above could also be fabricated of an ultramolecular-oriented polymer. As is described in an article entitled "Molecular Composites - Can They Replace Metals?", appearing in the September 1975 issue of "Plastics Engineering" magazine, at pages 42–43, ultramolecular-oriented polymers comprise aligned and extended molecular chains surrounded by randomly oriented and unextended molecular chains. In a shell formed of such a polymer, the aligned molecular chains would provide the required filamentary structure, while the unaligned molecular chains would provide the matrix.

It will be understood that the embodiments described above are merely exemplary and that persons skilled in the art may make many variations and modifications without departing from the spirit and scope of the invention. All such modifications and variations are intended to be within the scope of the invention as defined in the appended claims.

What is claimed is:

1. A compression mounting comprising
    a body of elastomer,
    first load-transmitting means for engaging and covering at least part of a first surface of the body of elastomer, second load-transmitting means for engaging and covering at least part of a second surface of the body of elastomer opposite and spaced from said first surface, the first and second load-transmitting means being disposed and configured to expose a circumferential surface of the body of elastomer, and shell means for completely covering and enclosing at least a circumferential portion of the exposed circumferential surface of the body of elastomer, said shell means including (a) filamentary means providing a plurality of substantially parallel and juxtaposed filament portions oriented to circumscribe the exposed circumferential surface, the filament portions being less extensible than said elastomer, and (b) matrix means encasing the filament portions of the filamentary means and flexibly bonding adjacent filament portions to one another in substantially parallel relationship, the shell means snugly fitting the exposed circumferential surface and the filamentary means causing the shell means to be more resistant to circumferential expansion than the body of elastomer so as at least to impede circumferential expansion of said portion of the exposed surface of the body of elastomer in response to compressive loads applied to the body through the load-transmitting means, adjacent filament portions in the shell means being movable in parallel planes relative to each other so that the shell means can deflect in response to torsional loads on the mounting.

2. A mounting, according to claim 1, wherein each load-transmitting means includes a rigid cover member engaging and covering the corresponding part of the first and second surfaces.

3. A mounting, according to claim 2, wherein the rigid cover members are bonded to the body of elastomer.

4. A mounting, according to claim 1, wherein said first and second load-transmitting means are disposed at opposite ends of the body of elastomer and each load-transmitting means includes a flange member, said flange members extending laterally beyond side edges of the body of elastomer so as to engage the shell means adjacent the ends of the body.

5. A mounting, according to claim 1, wherein the filamentary means includes a single continuous strand fabricated of a multiplicity of filaments oriented generally lengthwise of the strand, said strand being helically wound in a plurality of turns around the body of elastomer, the filament portions of the filamentary means including adjacent portions of distinct filaments in the strand and any adjacent turns of an individual filament.

6. A mounting, according to claim 5, wherein the matrix means encases each individual turn of the strand.

7. A mounting, according to claim 1, wherein the matrix means bonds the shell means to the body of elastomer.

8. A mounting, according to claim 1, wherein the body of elastomer is cylindrical.

9. A mounting, according to claim 1, wherein the shell means completely covers all of the exposed circumferential surface of the body of elastomer, the shell means and the load-transmitting means cooperating to cover all exterior surfaces of the body of elastomer.

10. A mounting, according to claim 1, wherein the filament portions are substantially nonextensible as compared to the elastomer and the shell means is substantially nonextensible in a circumferential direction as compared to the body of elastomer so as to prevent circumferential expansion of said portion of the exposed surface of the body of elastomer.

11. A mounting, according to claim 1, wherein the filamentary means also provides a plurality of juxtaposed filament portions that are each oriented to extend (a) transversely of said filament portions oriented to circumscribe the exposed circumferential surface and (b) in a polar direction relative to the body of elastomer.

12. A torsionally flexible compression mounting comprising a body of elastomer, means at each of two opposed ends of said body of elastomer for engaging and covering at least said ends of the body, said end engaging means being disposed and configured so as to define between the ends of the body of elastomer an exposed circumferential surface of said body, and shell means for completely covering and enclosing at least a circumferential portion of the exposed circumferential surface of the body of elastomer, said shell means including a continuous strand of fibrous material that is substantially nonextensible as compared to the body of elastomer, the strand being coated with an elastomeric coating and helically wound in a multiplicity of turns around and snugly fitting the exposed circumferential surface, the elastomeric coating flexibly bonding adjacent turns of the strand to one another, the strand preventing circumferential expansion of said portion of the exposed surface of the body of elastomer in response to compressive loads applied to the ends of the body, adjacent turns of the strand being movable parallel to each other in the direction of the strand in response to torsional loads on the mounting.

13. A mounting, according to claim 12, wherein the shell means completely covers all of the exposed circumferential surface of the body of elastomer, the shell means and the end engaging means cooperating to cover all exterior surfaces of the body of elastomer.

* * * * *

UNITED STATES PATENT OFFICE
CERTIFICATE OF CORRECTION

Patent No. 4,006,892      Dated August 15, 1977

Inventor(s) James B. Koeneman

It is certified that error appears in the above-identified patent and that said Letters Patent are hereby corrected as shown below:

Column 4, line 42, "Kevlar" should read -- Kevlar® --.

Column 5, line 2, "Chemglaze" should read -- Chemglaze® --; and Adiprene" should read -- Adiprene® --.

Column 5, line 3, "Chemglaze" should read -- Chemglaze® --.

Column 5, line 4, "Poly B-D" should read -- Poly D-B® --.

Column 6, line 21, "Kevlar" should read -- Kevlar® --.

Column 6, line 48, "occrs" should read -- occurs --.

Signed and Sealed this

*Twenty-fifth* Day *of October 1977*

[SEAL]

*Attest:*

RUTH C. MASON  
*Attesting Officer*

LUTRELLE F. PARKER  
*Acting Commissioner of Patents and Trademarks*